(12) United States Patent
Kroeger et al.

(10) Patent No.: US 9,178,740 B1
(45) Date of Patent: Nov. 3, 2015

(54) PEAK-TO-AVERAGE POWER RATIO REDUCTION FOR QAM MODULATION WITH HD RADIO SIGNALS

(71) Applicant: iBiquity Digital Corporation, Columbia, MD (US)

(72) Inventors: Brian W. Kroeger, Sykesville, MD (US); Harvey Chalmers, Rockville, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 14/478,233

(22) Filed: Sep. 5, 2014

Related U.S. Application Data (60) Provisional application No. 62/042,007, filed on Aug. 26, 2014.

(51) Int. Cl.
*H04L 27/34* (2006.01)
*H04L 27/38* (2006.01)
*H04L 25/03* (2006.01)
*H04L 27/26* (2006.01)
*H04L 27/36* (2006.01)

(52) U.S. Cl.
CPC ...... *H04L 27/3411* (2013.01); *H04L 25/03834* (2013.01); *H04L 27/2627* (2013.01); *H04L 27/2649* (2013.01); *H04L 27/367* (2013.01); *H04L 27/38* (2013.01); *H04L 27/3809* (2013.01)

(58) Field of Classification Search
CPC . H04L 25/03834; H04L 27/366; H04L 23/02; H04L 25/03006; H04L 27/00; H04L 27/38; H04L 25/08; H04L 27/34; H04L 27/3405; H04L 27/3818; H04L 27/3863; H04L 27/3411; H04L 27/367; H04L 27/2627; H04L 27/2649; H04L 27/3809
USPC ............ 375/295, 296, 259, 261, 268; 455/91, 455/114.2, 114.3
See application file for complete search history.

(56) References Cited

U.S. PATENT DOCUMENTS

| | | | |
|---|---|---|---|
| 6,128,350 A | 10/2000 | Shastri et al. | |
| 7,263,144 B2 * | 8/2007 | Sasson et al. | 375/345 |
| 7,542,517 B2 | 6/2009 | Kroeger | |
| 8,675,769 B1 * | 3/2014 | Eliaz | 375/295 |
| 8,798,196 B2 | 8/2014 | Kroeger | |

OTHER PUBLICATIONS

"In-Band/On-Channel Digital Radio Broadcasting Standard", NRSC-5-C, National Radio Systems Committee, Washington, DC, Sep. 2011.

* cited by examiner

*Primary Examiner* — Vineeta Panwalkar
(74) *Attorney, Agent, or Firm* — Robert P. Lenart, Esq.; Pietragallo Gordon Alfano Bosick & Raspanti, LLP (57) ABSTRACT

A peak-to-average power reduction method includes: (a) quadrature amplitude modulating a signal including a set of subcarriers with a set of data to produce an OFDM modulated symbol vector; (b) limiting the magnitude of the modulated symbol vector to produce a first limited OFDM modulated symbol; (c) demodulating the first limited OFDM modulated symbol to recover distorted QAM constellations; (d) constraining points in the distorted QAM constellations recovered from the first limited OFDM modulated symbol to produce constrained QAM constellations; (e) modulating an OFDM symbol vector with the constrained QAM constellations to produce a modified modulated OFDM symbol; and (f) output the modified modulated OFDM symbol. A transmitter that implements the method is also provided.

20 Claims, 8 Drawing Sheets

PEAK-TO-AVERAGE POWER RATIO REDUCTION FOR QAM MODULATION WITH HD RADIO SIGNALS

CROSS REFERENCE TO RELATED APPLICATIONS

This application claims the benefit of U.S. Provisional Patent Application No. 62/042,007, filed Aug. 26, 2014, and titled "Peak-To-Average Power Ratio Reduction For QAM Modulation With HD Radio Signals", which is hereby incorporated by reference.

FIELD OF THE INVENTION

This invention relates to signal processing for radio frequency signals, and more particularly to signal processing for reducing the peak to average power ratio (PAR) in quadrature amplitude modulated (QAM) orthogonal frequency division modulated (OFDM) radio frequency signals.

BACKGROUND OF THE INVENTION

HD Radio™ digital broadcasting is a medium for providing digital-quality audio, superior to existing analog broadcasting formats. Both AM and FM HD Radio signals can be transmitted in a hybrid format where the digitally modulated signal coexists with the currently broadcast analog AM or FM signal, or in an all-digital format without an analog signal. In-band-on-channel (IBOC) BD Radio systems require no new spectral allocations because each HD Radio signal is simultaneously transmitted within the same spectral mask of an existing AM or FM channel allocation. IBOC HD Radio broadcasting promotes economy of spectrum while enabling broadcasters to supply digital quality audio to their present base of listeners. An HD Radio digital broadcasting system is described in U.S. Pat. No. 6,549,544, which is hereby incorporated by reference. The National Radio Systems Committee, a standard-setting organization sponsored by the National Association of Broadcasters and the Consumer Electronics Association, adopted an IBOC standard, designated NRSC-5C, the disclosure of which is incorporated herein by reference, which sets forth the requirements for broadcasting digital audio and ancillary data over AM and FM broadcast channels. A copy of the standard can be obtained from the NRSC at http://www.nrscstandards.org.

HD Radio broadcasting systems use a set of orthogonal frequency division multiplexed (OFDM) subcarriers to transmit a digital signal. OFDM modulation is a well-known technique that modulates a vector of information symbols in parallel over multiple subcarriers modulated at different equally spaced frequencies, which are orthogonal to each other. This ensures that different subcarriers do not interfere with each other under normal channel conditions. OFDM modulation has proven to be an effective means for transmission over channels that experience various types of multipath and linear distortion.

A well-known drawback of OFDM is its relatively high PAR. For a large number of subcarriers, each complex dimension (in-phase and quadrature) of the OFDM signal approaches a Gaussian distribution. This results in a signal magnitude (square root of power) Probability Density Function (PDF) that approaches a Rayleigh distribution. Although the Rayleigh distribution has theoretically infinite peaks, the OFDM peak is limited by the number of parallel subcarriers (e.g., 100, or 20 dB), or more practically the typical peak can be limited to about 12 dB since there is little distortion in clipping the improbable tails (e.g., above 12 dB PAR) of the Rayleigh PDF. High Power Amplifier (HPA) power efficiency is affected since a large power backoff is required in operation to minimize peak distortion. This peak distortion not only distorts (i.e., adds noise to) the subcarrier modulation, but unwanted out-of-band emission occurs due to intermodulation distortion. This leakage, being highest immediately outside the intended spectral occupancy, can be particularly difficult to suppress with filters after the HPA output.

Several different types of PAR reduction techniques have been proposed. One peak-to-average power ratio reduction technique is described in U.S. Pat. No. 6,128,350, issued Oct. 3, 2000, and titled "Method And Apparatus For Reducing Peak-To-Average Power Ratio In Digital Broadcasting Systems". Another peak to average power ratio reduction technique is described in U.S. Pat. No. 7,542,517, issued Jun. 2, 2009, and titled "Peak-To-Average Power Reduction For FM OFDM Transmission". Another peak-to-average power ratio reduction technique is described in U.S. Pat. No. 8,798,196, issued Aug. 5, 2014, and titled "Peak-To-Average Power Ratio Reduction For Hybrid FM HD Radio Transmission". U.S. Pat. Nos. 6,128,350; 7,542,517; and 8,798,196 are hereby incorporated by reference. However, these PAR reduction techniques do not address PAR reduction when the signal of interest includes QAM modulation.

SUMMARY OF THE INVENTION

In a first aspect, the invention provides a method including: (a) quadrature amplitude modulating a signal including a set of subcarriers with a set of data to produce an OFDM modulated symbol vector; (b) limiting the magnitude of the modulated symbol vector to produce a first limited OFDM modulated symbol; (c) demodulating the first limited OFDM modulated symbol to recover distorted QAM constellations; (d) constraining points in the distorted QAM constellations recovered from the first limited OFDM modulated symbol to produce constrained QAM constellations wherein: points at corners of the distorted QAM constellations are constrained both in-phase and in-quadrature to values greater than or equal to a first minimum threshold; points along edges (but not corners) of the distorted QAM constellations are constrained to either in-phase values greater than or equal to a second minimum threshold value and in quadrature to a first predetermine range of values on either side of the undistorted constellation point, or in-quadrature to values greater than or equal to a third minimum threshold value and in phase to a second predetermine range of values on either side of the undistorted constellation point; and internal points of the distorted QAM constellations are constrained to both in-phase or in-quadrature values less than or equal to a third predetermined range of values on either side of the undistorted constellation point; (e) modulating an OFDM symbol vector with the constrained QAM constellations to produce a modified modulated OFDM symbol; and (f) output the modified modulated OFDM symbol.

In another aspect, the invention provides a transmitter including: a modulator configured to quadrature amplitude modulate a signal including a set of subcarriers with a set of data to produce an OFDM modulated symbol vector; processing circuitry configured to (a) limit the magnitude of the modulated symbol vector to produce a first limited OFDM modulated symbol; (b) demodulate the first limited OFDM modulated symbol to recover distorted QAM constellations; (c) constrain points in the distorted QAM constellations recovered from the first limited OFDM modulated symbol to produce constrained QAM constellations wherein: points at corners of the distorted QAM constellations are constrained both in-phase and in-quadrature to values greater than or equal to a first minimum threshold; points along edges (but not corners) of the distorted QAM constellations are constrained to either in-phase values greater than or equal to a second minimum threshold value and in quadrature to a first predetermine range of values on either side of the undistorted constellation point, or in-quadrature to values greater than or equal to a third minimum threshold value and in phase to a second predetermine range of values on either side of the undistorted constellation point; and internal points of the distorted QAM constellations are constrained to both in-phase or in-quadrature values less than or equal to a third predetermined range of values on either side of the undistorted constellation point; (d) modulate an OFDM symbol vector with the constrained QAM constellations to produce a modified modulated OFDM symbol; and (e) output the modified modulated symbol; and an amplifier for amplifying the modified modulated OFDM symbol.

DETAILED DESCRIPTION OF THE INVENTION

In one aspect, this invention relates to peak-to-average power (PAR) reduction technique applicable to QAM signals. It is applicable to FM Hybrid and All-digital HD Radio signals where QAM replaces QPSK for some or all of the OFDM subcarriers. It is also applicable to AM Hybrid or All-digital HD Radio signals, but especially useful for the AM all-digital modes. The disclosed methods include several steps used in the method described in U.S. Pat. No. 8,798,196. However, the disclosed methods include one or more steps for constraining QAM constellations, whereas the method described in U.S. Pat. No. 8,798,196 is related to constraining QPSK constellations.

Figure 1:
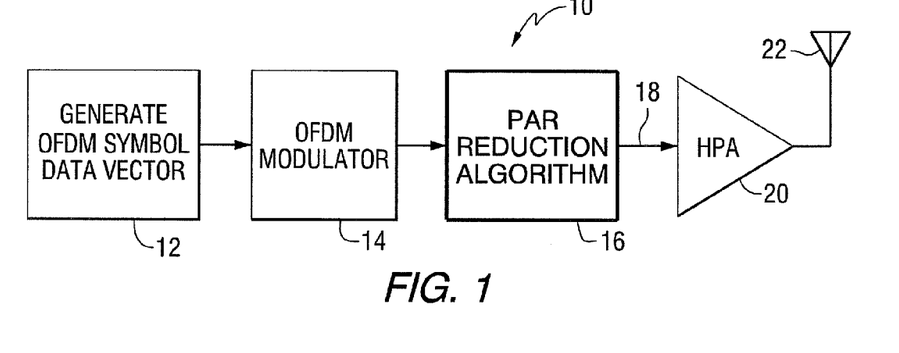
FIG. 1 is a simplified block diagram of a transmitter with PAR reduction.

FIG. 1 is a simplified functional block diagram of a transmitter 10 system including a PAR reduction algorithm inserted between an OFDM modulator and a high power amplifier (HPA). The transmitter includes a symbol generator 12 that produces OFDM symbol data vectors comprised of groups of QAM coded bits containing the information to be transmitted on a plurality of digitally modulated subcarriers. These symbols are passed to an OFDM modulator 14 which converts the vector data into a time domain sequence of signal samples. The modulated output of the OFDM modulator is passed as an input to the PAR reduction algorithm 16. The PAR reduction algorithm reduces the signal peaks. The output 18 from the PAR reduction algorithm is amplified by the high power amplifier 20 and forms the signal to be transmitted with a reduced PAR at antenna 22.

Figure 2:
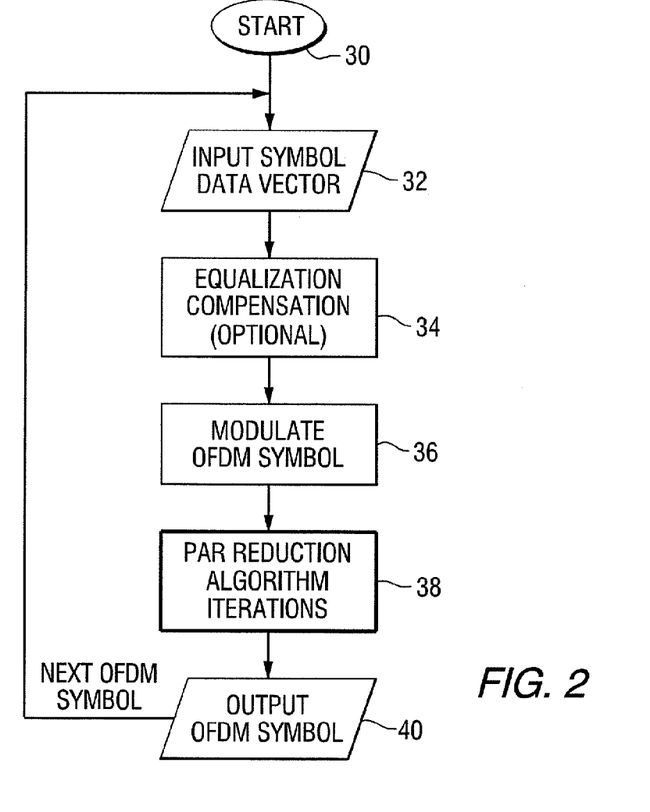
FIG. 2 is a top-level flowchart of a PAR reduction algorithm.

A top-level flowchart of major PAR reduction algorithm steps for an FM hybrid IBOC system is presented in FIG. 2. This flowchart starts at block 30 and shows the operations of inputting an OFDM symbol vector, through outputting modulated and PAR-reduced time domain signal samples for each OFDM symbol. The Input OFDM Symbol Vector block 32 shows that the input is a data vector comprising the bits for each active QAM subcarrier for the OFDM symbol. This can be viewed as the frequency-domain representation for each FFT bin (subcarrier) prior to OFDM modulation, where the FFT converts a complex time-domain signal block into complex frequency component bins uniformly spaced over the sample-rate bandwidth. Each active bin is represented by a complex number for QAM modulation on that bin (subcarrier). Active bins with intentionally-reduced signal levels can be scaled to other binary sets of levels. Inactive bins are initially set to zero.

The Equalization Compensation block 34 shows an optional equalization compensation step. When linear distortion (filtering) is a significant factor at the transmitter's output network (HPA output), then equalization compensation can be used to precorrect the input to the HPA. The equalization compensation uses a vector (the same size as the input vector) containing the reciprocal of the complex output gain (linear distortion) for each subcarrier. The complex gain associated with each bin is a complex number which, in effect, multiplies (distorts) the original complex frequency sample (bin). Each of the elements of the input vector is multiplied by each of the corresponding element of the equalization vector to yield an equalized input symbol data vector.

The equalization compensation uses a vector (the same size as the OFDM symbol input vector) containing the reciprocal of the complex output gain (linear distortion) values for each subcarrier (active or inactive). Each of the elements of the input vector is multiplied by each of the corresponding elements of the equalization vector to yield an equalized input OFDM symbol data vector.

The Modulate OFDM Symbol block 36 shows that the input symbol data vector is converted into a time domain signal for each OFDM symbol. This transformation is performed via an Inverse Complex Fast Fourier Transform (IFFT), and then a cyclic prefix with a predetermined guard time is appended to the end of the output vector prior to tapering the ends of the symbol with a root-Nyquist pulse shape. This guard time, cyclic prefix extension, and windowing are used to improve the signal's performance in the presence of multipath interference, as well as to suppress the frequency sidelobes of the subcarriers resulting in reduced out-of-band emissions.

Both modulation and demodulation are used in the PAR reduction process of block 38 of FIG. 2. An example of the process in block 38 is described in FIG. 12. The OFDM modulation and demodulation steps in the above algorithm remain unchanged, although the resulting OFDM symbol time domain samples are somewhat different due to the equalization. The equalization within the PAR reduction algorithm is either removed or restored at several steps in the algorithm such that the QAM constraints imposed on the OFDM symbol vectors do not undo the equalization. Examples of the Equalization Compensation and removal algorithms are described in U.S. Pat. No. 8,798,196.

The PAR reduction algorithm iterations block 38 represents the algorithms used in reducing the PAR of the modulated OFDM symbol. The Output OFDM Symbol block 40 outputs the time domain samples of the PAR-reduced OFDM signal. Then the process continues for subsequent OFDM symbols.

An FM PAR reduction method described in U.S. Pat. No. 8,798,196, includes the following steps:
1. Clip a time-domain signal;
2. Remove an analog signal (for hybrid signals);
3. Demodulate the signal (using window/fold/FFT);
4. Constrain (e.g., limit) the signal constellations;
5. Apply a noise spectral mask (controls out-of-band emissions);
6. Remodulate and reapply the analog signal (for hybrid signals); and
7. Iterate steps 1-6.

The FM PAR reduction method described in U.S. Pat. No. 8,798,196 constrains distorted QPSK constellations. However, FM PAR reduction method described in U.S. Pat. No. 8,798,196 does not address signals that include QAM modulation. For FM hybrid and FM All Digital signals utilizing QAM modulation, a different method is necessary in step 4 to constrain the signal constellations.

Figure 3:
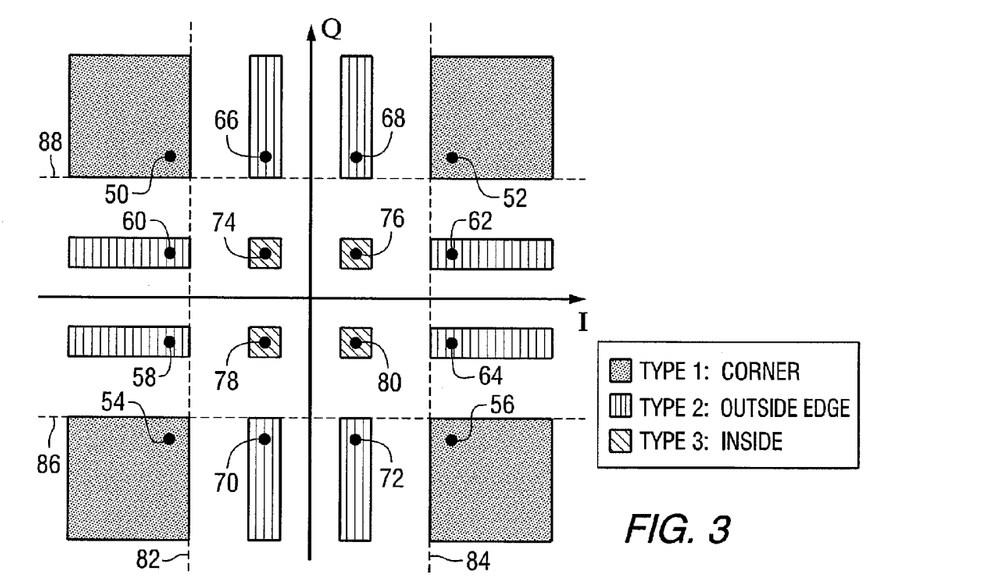
FIG. 3 is a schematic representation of an FM 16-QAM signal constellation.
Figure 4:
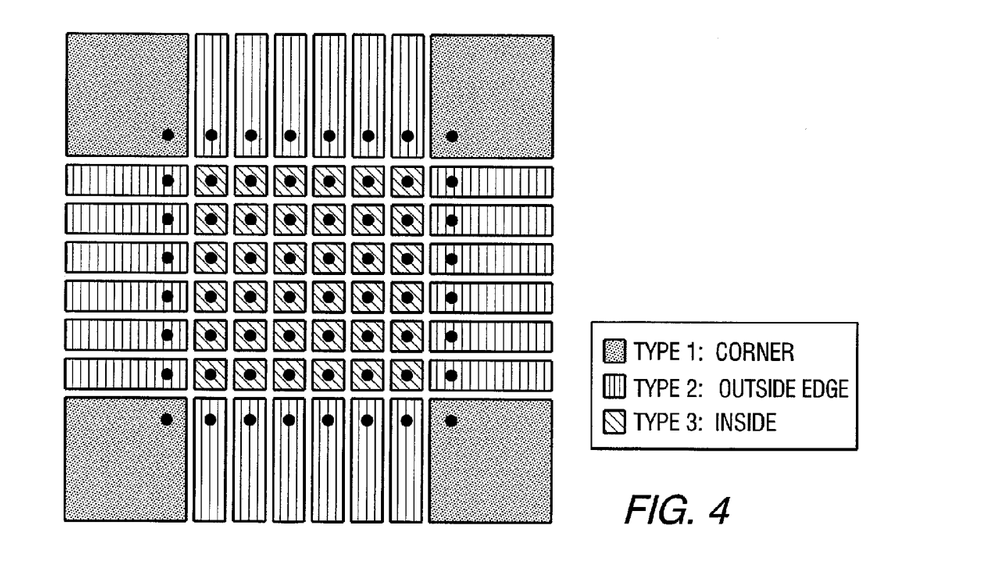
FIG. 4 is a schematic representation of an FM 64-QAM signal constellation.

Certain embodiments include steps 1 through 7 listed above, wherein the constraining step is implemented in a manner suitable for use with signals that include QAM modulation. In one embodiment, FM QAM PAR reduction constrains the QAM Constellation. FIG. 3 is a schematic representation of an FM 16-QAM signal constellation. FIG. 4 is a schematic representation of a hybrid 64-QAM signal constellation after 8 iterations. For this description, QAM constellation points are categorized in three types: Type 1 points are located at the outer corners of the constellation; Type 2 points are located on the outer edges of the constellation (but exclude the outer corner points); and Type 3 points are located in the inside of the constellation.

Referring to FIG. 3, for an FM 16-QAM signal constellation, in a PAR reduction method of one embodiment, the constellation points are constrained to the shaded or hatched areas of FIG. 3. Corner constellation points 50, 52, 54 and 56 (Type 1) are constrained both in-phase and in-quadrature to values greater than or equal to a first minimum threshold. Edge constellation points 58, 60, 62 and 64 (Type 2) of the distorted QAM constellations are constrained to in-phase values greater than or equal to a second minimum threshold value and in quadrature to a first predetermine range of values on either side of the undistorted constellation point. Edge constellation points 66, 68, 70 and 72 (Type 2) are constrained in-quadrature to values greater than or equal to a third minimum threshold value and in phase to a second predetermine range of values on either side of the undistorted constellation point. Internal constellation points 74, 76, 78 and 80 (Type 3) are constrained to both in-phase or in-quadrature values less than or equal to a third predetermined range of values on either side of the undistorted constellation point.

In FIG. 3, lines 82 and 84 represent threshold values in the in-phase component of the constellation points, and lines 86 and 88 represent quadrature component threshold values. The vertical heights of the hatched blocks for the edge points 58, 60, 62 and 64 points represent a range of values. The horizontal widths of the hatched blocks for the edge points 66, 68, 70 and 72 represent a range of values. The horizontal widths and vertical heights of the hatched blocks for the inner points represent a range of values in the in-phase and quadrature components, respectively, for the inner constellation points.

In the PAR reduction methods described herein, Type 1 constellation points are processed like the QPSK of U.S. Pat. No. 8,798,196. Type 2 and 3 constellation points are processed differently. Distortion is constrained to shaded areas of the figures. Reference subcarriers are restored to the original undistorted input values.

FIG. 4 is a graph of an FM 64-QAM signal spectrum. As in the FIG. 3, the constellation points include corner points, edge points and inner points. Again, the constellation points are constrained to the shaded or hatched areas of the figure.

Figure 5:
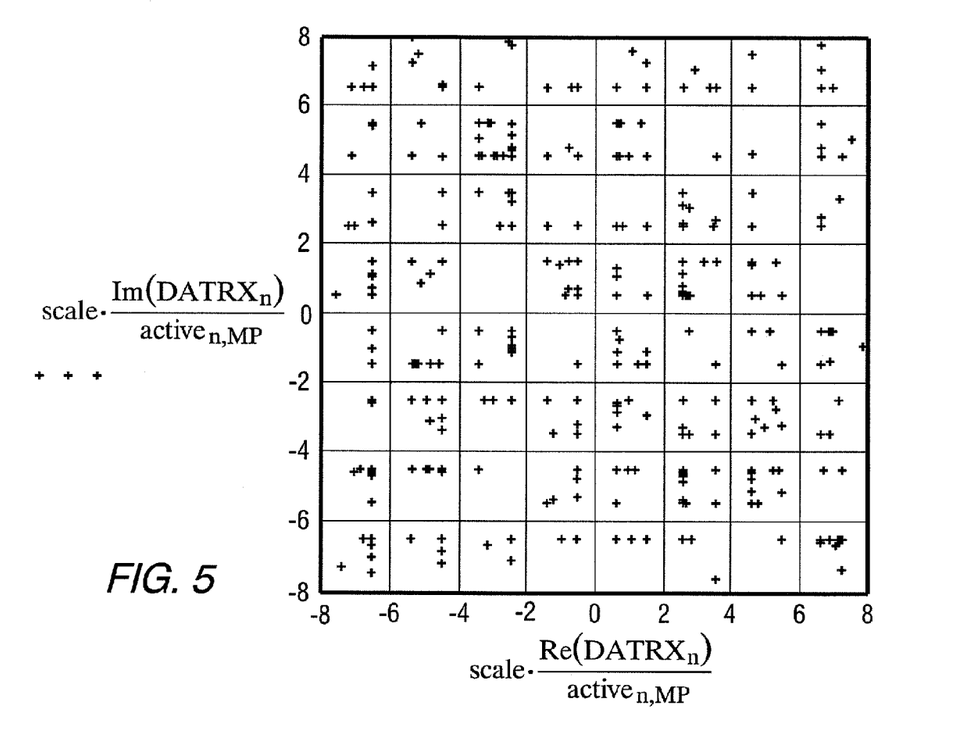
FIG. 5 is illustrates a hybrid 64-QAM signal constellation after 8 iterations.

FIG. 5 is a time domain plot of an FM hybrid 64-QAM signal constellation after 8 iterations of a PAR reduction algorithm. FIG. 5 is an example of the constrained constellation points of all the active QAM subcarriers spanning one OFDM symbol time.

Figure 6:
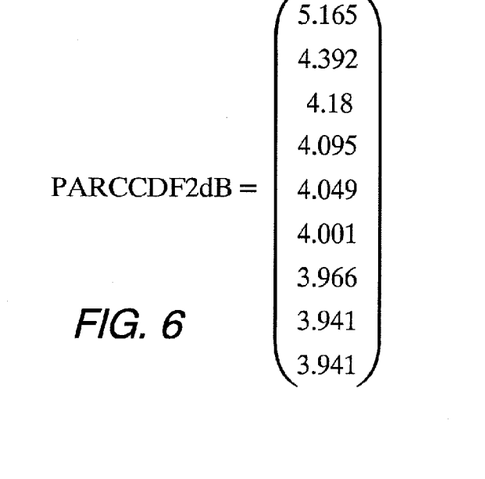
FIG. 6 shows an FM peak to average power ratio for 8 iterations.

FIG. 6 shows an FM peak to average power ratio in dB for each of 8 iterations at 0.01% CCDF, with the top number being the average power ratio before processing and the bottom number being the average power ratio after 8 iterations.

Figure 7:
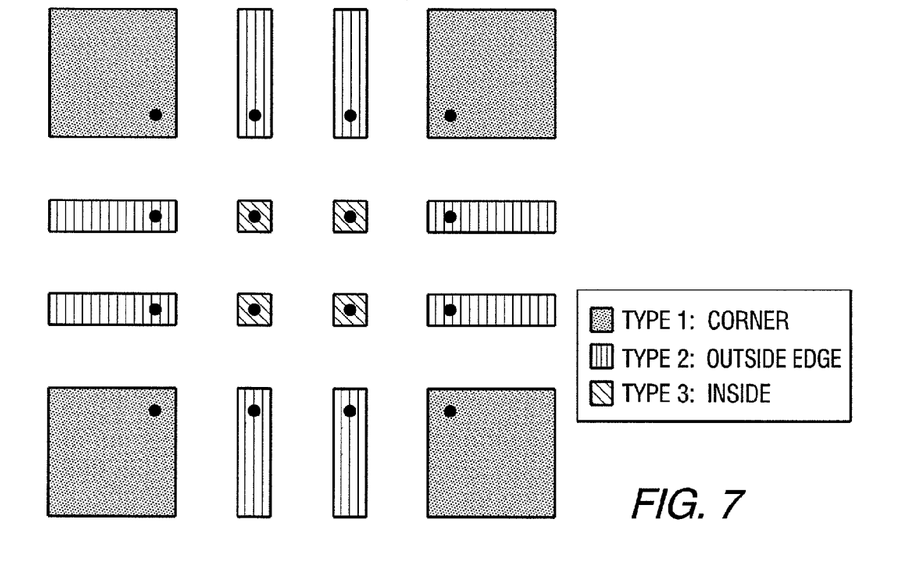
FIG. 7 is a schematic representation of an AM 16-QAM signal constellation.
Figure 8:
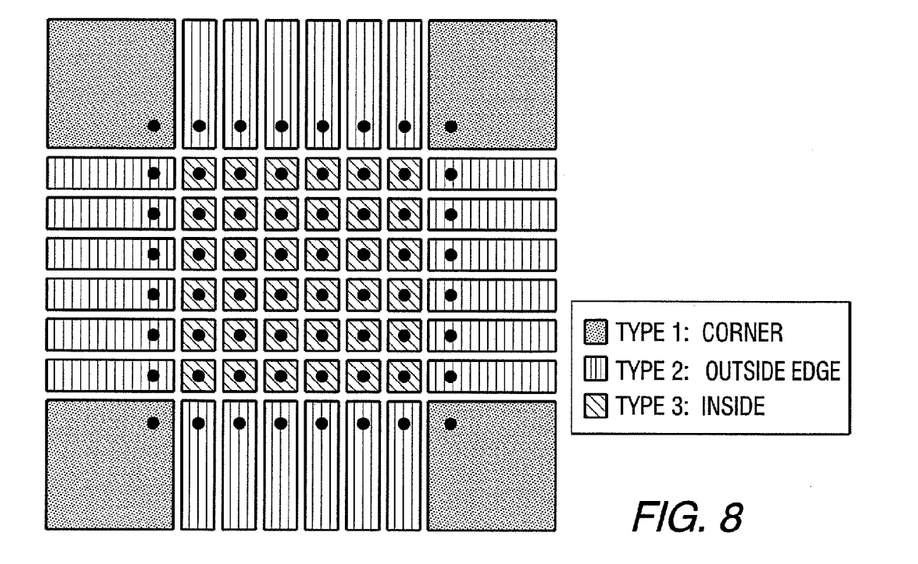
FIG. 8 is a schematic representation of an AM 64-QAM signal constellation.

In other embodiments, this invention is applied to AM QAM constellations. FIG. 7 is a schematic representation of an AM 16-QAM signal constellation. FIG. 8 is a schematic representation of an AM 64-QAM signal constellation. FIGS. 7 and 8 are the same as FIGS. 3 and 4, except that FIGS. 3 and 4 show FM constellations, while FIGS. 7 and 8 show AM constellations.

Figure 9:
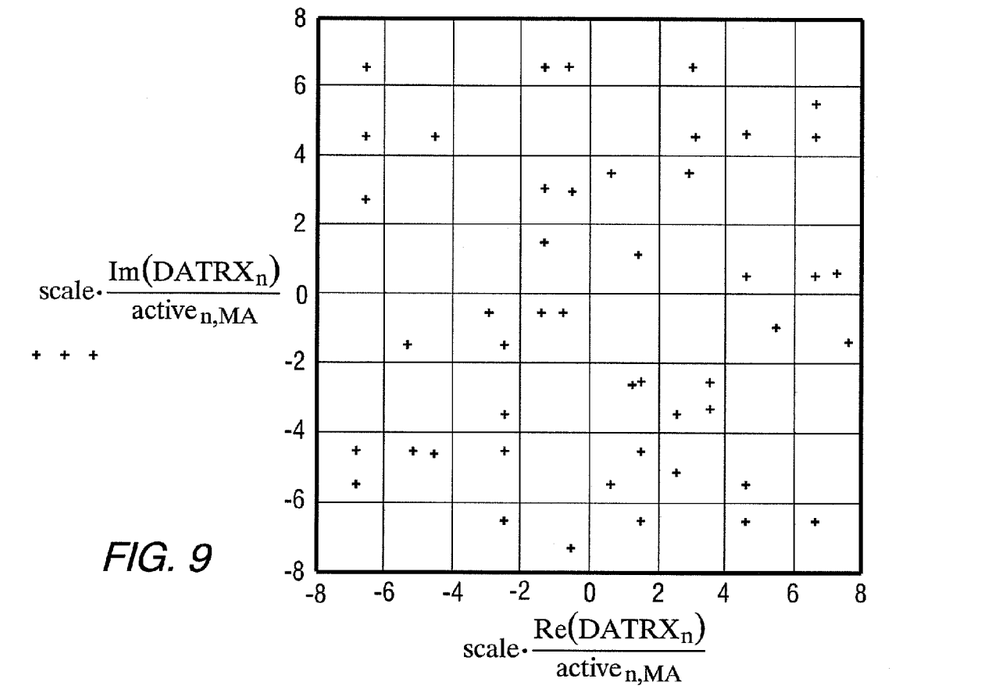
FIG. 9 illustrates an AM reduced bandwidth waveform 64-QAM signal constellation after 8 iterations.

FIG. 9 is a schematic representation of an AM all-digital reduced digital bandwidth waveform (core only) 64-QAM signal constellation after 8 iterations of a PAR algorithm.

Figure 10:
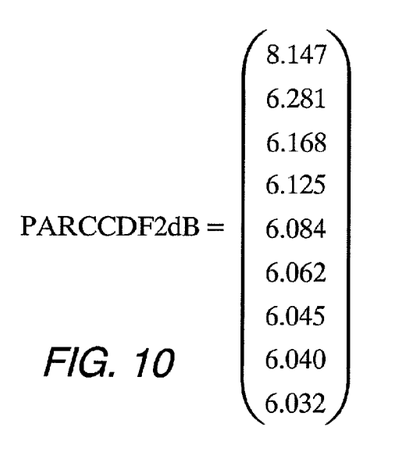
FIG. 10 shows a peak to average power ratio for 8 iterations.

FIG. 10 shows a peak to average power ratio in dB after each of 8 iterations, with 0.01% CCDF, with the top number being the average power ratio before processing and the bottom number being the average power ratio after 8 iterations.

The constraining step removes the significant distortion introduced when clipping the time domain signal. The intermodulation distortion caused by clipping introduces noise (distortion) into all the frequency bins of the symbol vector. The constraint function constrains the distortion components to acceptable levels. This distortion cannot be entirely eliminated since this would have the undesirable effect of restoring the peaks back into the time domain signal. Instead the distortion is modified in such a way as to minimize the degradation in QAM demodulation performance, and suppress out-of-band emissions to an acceptable level based upon a predefined out-of-band emissions mask vector. This process results in partial peak regrowth of the time domain signal. Multiple iterations tend toward convergence to minimize the peaks while constraining the intermodulation products to acceptable levels.

The QAM constellations of the active subcarriers are constrained to minimize degradation in receiver BER (bit error ratio) performance. In the absence of noise and distortion, the ideal QAM constellation consists of complex constellation points. The constellation points are arranged on a 4-by-4 grid for 16 QAM (see FIG. 3 and FIG. 7), 8-by-8 for 64 QAM (see FIG. 4 and FIG. 8), and 16-by-16 for 256 QAM. QAM can also be viewed as a pair of orthogonal ASK signals, where each of the ASK complex dimensions carries $\log_2$ of the size of that dimension.

For example, the 16 QAM has $\log_2(4)=2$ bits for each dimension, or 4 bits for the complex 16 QAM constellation. The PAR reduction algorithm, in particular the clipping, adds noise to the constellation points. A bit error occurs when this additive noise causes the result to cross a decision boundary to another grid point. The channel adds more noise to the received signal and the BER performance is a function of the margin of the transmitted signal. Even with Forward Error Correction (FEC) improving the output BER at the receiver, the performance is degraded by the code bits that decrease the margin. Therefore the described PAR reduction algorithms constrain the loss in margin to an acceptable level.

As shown in FIG. 3, FIG. 4, FIG. 7, and FIG. 8, there are three types of QAM signal constellation points. Type 1 constellation points are on the corners. The noise affecting the outside corner constellation points is limited in a similar way as the QPSK is handled (see U.S. Pat. No. 8,798,196). Type 2 constellation points are non-corner points on the outside edges. Type 2 constellation points are limited in just the appropriate dimension. This constraint has the effect of minimizing the worst case margin loss for any particular bit, while causing only modest peak signal regrowth in the time domain signal.

Type 3 constellation points are at the interior of the constellation. The noise affecting inside constellation points is limited to a box around the undistorted constellation point.

The all-digital AM signal is a special case where the main carrier can also be modulated to aid in cancelling the peaks. A feedback control algorithm can be used to maintain a constant average main carrier level while occasionally compensating for symbols with higher-than-average peaks.

AM PAR reduction embodiments also constrain the QAM constellation. Type 1 constellation points processed in the same manner as for the QPSK in U.S. Pat. No. 8,798,196. Type 2 and 3 constellation points are processed differently. Distortion must be constrained to the shaded areas of the figures. The AM training symbols (constellation points) and BPSK-Modulated subcarriers are restored to their original undistorted values. Imaginary (Q Component) distortion is removed from AM main carrier.

For AM hybrid and All Digital signals, the following new features are included: (1) constraining the QAM constellation (using different technique than for QPSK), which includes restoring training symbols and BPSK subcarriers to original undistorted values and removing the Imaginary (Q component) distortion from the main AM carrier after PAR reduction; and (2) time domain peak reduction via adjustment of main carrier amplitude, wherein symbol pulse-shaping of main carrier keeps the amplitude adjustments orthogonal to other subcarriers; and a constant average main carrier amplitude is maintained.

Figure 11:
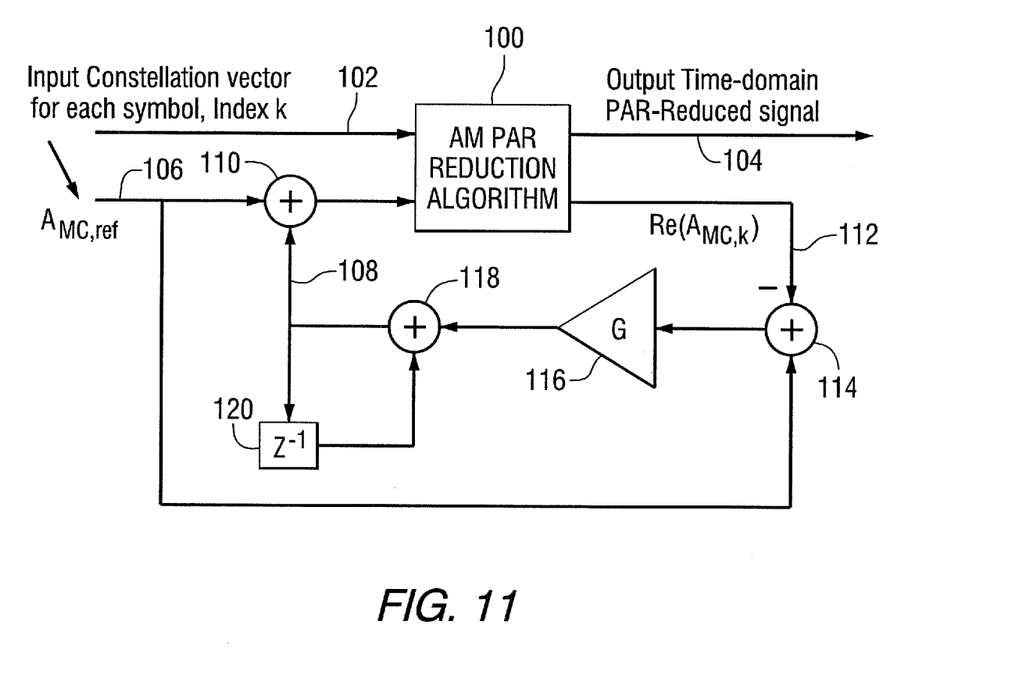
FIG. 11 is a schematic diagram that illustrates an AM main carrier adjustment technique to aid PAR reduction in an all-digital HD radio system.

FIG. 11 is a schematic diagram that illustrates an AM main carrier adjustment technique to aid PAR reduction. A feedback loop is included to maintain an average amplitude of the Main carrier.

In the example of FIG. 11, an AM PAR reduction algorithm 100 receives an input constellation vector for each symbol, at index k, on line 102, and outputs a time-domain PAR reduced signal on line 104. The AM main carrier is also input on line 106. A feedback signal on line 108 is added to the signal on line 106 at added 110. The AM Par reduction algorithm outputs the real components of the AM main carrier on line 112. The signal on line 112 is the PAR-modified main carrier amplitude that is subtracted from the signal on line 106 at combiner 114. The resulting signal is amplified by amplifier 116 and passed to adder 118. The out of adder 118 is delayed by delay 120 and fed back to the adder, which produces the feedback signal on line 108. The resulting main carrier amplitude is output on line 112. Although this amplitude can vary from symbol-to-symbol due to the PAR reduction algorithm, the average amplitude matches the fixed input amplitude on signal line 106. The effect is to temporarily reduce the Main carrier amplitude on symbols where the PAR is higher than average, but increase the Main carrier amplitude on symbols where the PAR is lower. The feedback mechanism maintains the average amplitude.

Figure 12:
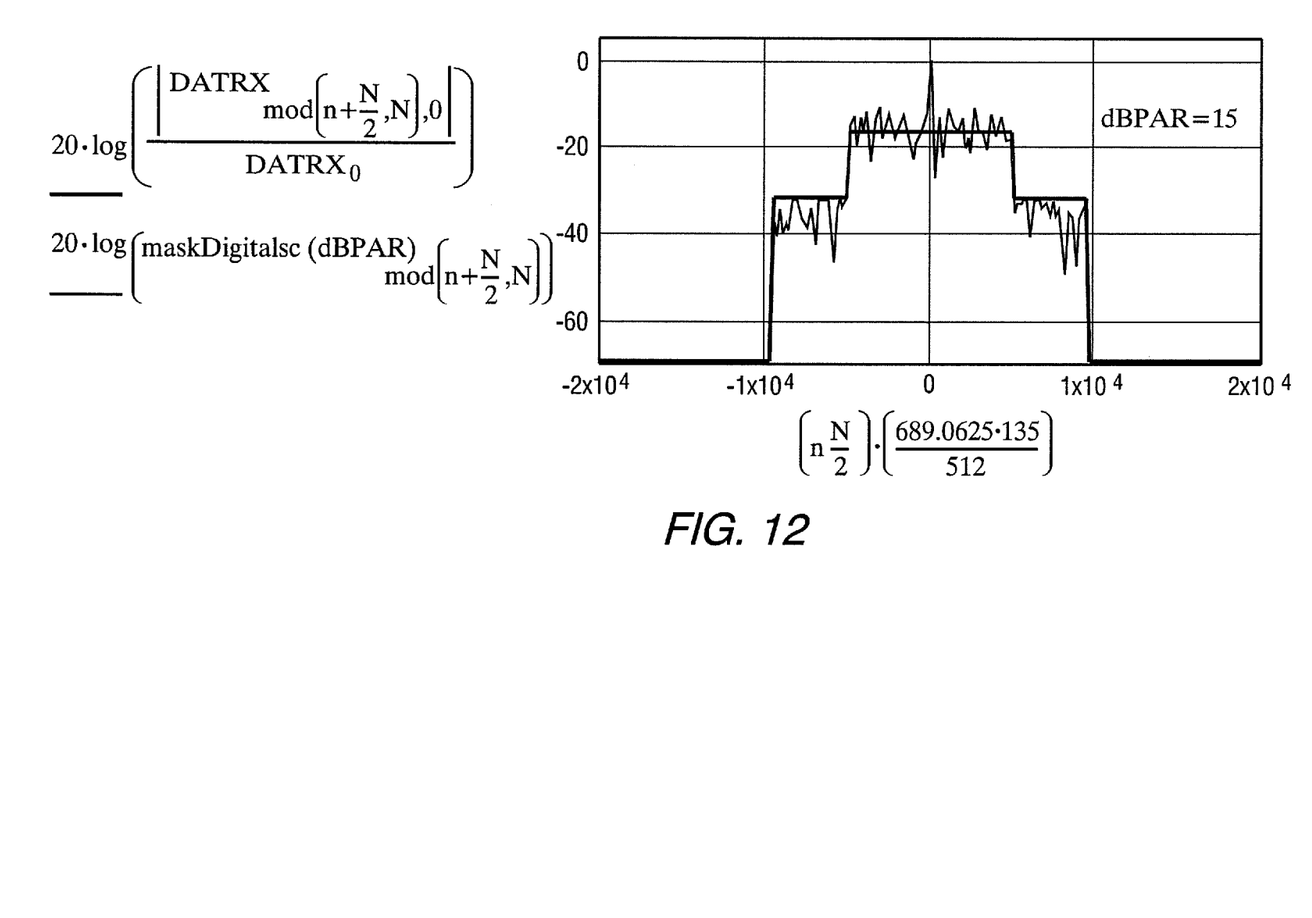
FIG. 12 is a graph of a spectrum and noise mask of an AM All-Digital Core-only signal.

The clipping operation affects the frequency. Clipping introduces intermodulation distortion which is spread across the Nyquist bandwidth (Nyquist bandwidth is equal to complex sample rate) of the signal. The active subcarriers carrying the QAM-modulated data are constrained as described herein. This intermodulation distortion on the inactive subcarriers is limited by applying a noise mask which also controls the out-of band emissions. This is described in detail in the U.S. Pat. No. 8,798,196, as well as in the description below. However there is a special case in the AM All-Digital Core-only mode that requires special consideration. A spectral plot of the AM All-Digital Core-only signal is shown in FIG. 12. The core subcarriers are located in the spectrum ±5 kHz from the center Main carrier. This is the top flat portion of the plot of FIG. 12 where the digital subcarriers are set at −15 dBc (relative to the Main carrier). Notice that a −30 dBc mask is applied in the spectrum 5 kHz to 10 kHz from the Main carrier. This mask would normally apply to the QAM-modulated digital subcarriers that would reside in these sidebands if the Enhancement data was transmitted in the Core plus Enhancement mode. But since the Core-only is transmitted in this case, the 5 kHz to 10 kHz sidebands are inactive, and a noise mask is applied instead. One might expect the noise mask to be set lower to reduce the signal occupancy for better adjacent channel interference control. However it is beneficial to allow intermodulation noise to reside here in lieu of the active subcarriers. This is because better PAR reduction can be achieved by allowing more intermodulation distortion. The mask in these sidebands can be adjusted to a level that is a reasonable compromise between interference and PAR reduction effectiveness.

In one aspect, the invention relates to a signal processing method directed toward reducing the peak to average power ratio (PAR) in QAM modulated OFDM radio frequency signals. This method offers improved performance for reducing the PAR while controlling undesirable out-of-band emissions. It can also include equalization within the PAR reduction algorithm to compensate for the effects of linear filter-like distortion caused by a high power amplifier (HPA) output network, as well as partial compensation for nonlinear signal compression and amplitude modulation/phase modulation (AM/PM) conversion below the peaks of the PAR-reduced signal. This method can provide an effective scheme for reducing the PAR of electronic signals using OFDM, such as FM HD Radio systems.

Figure 13:
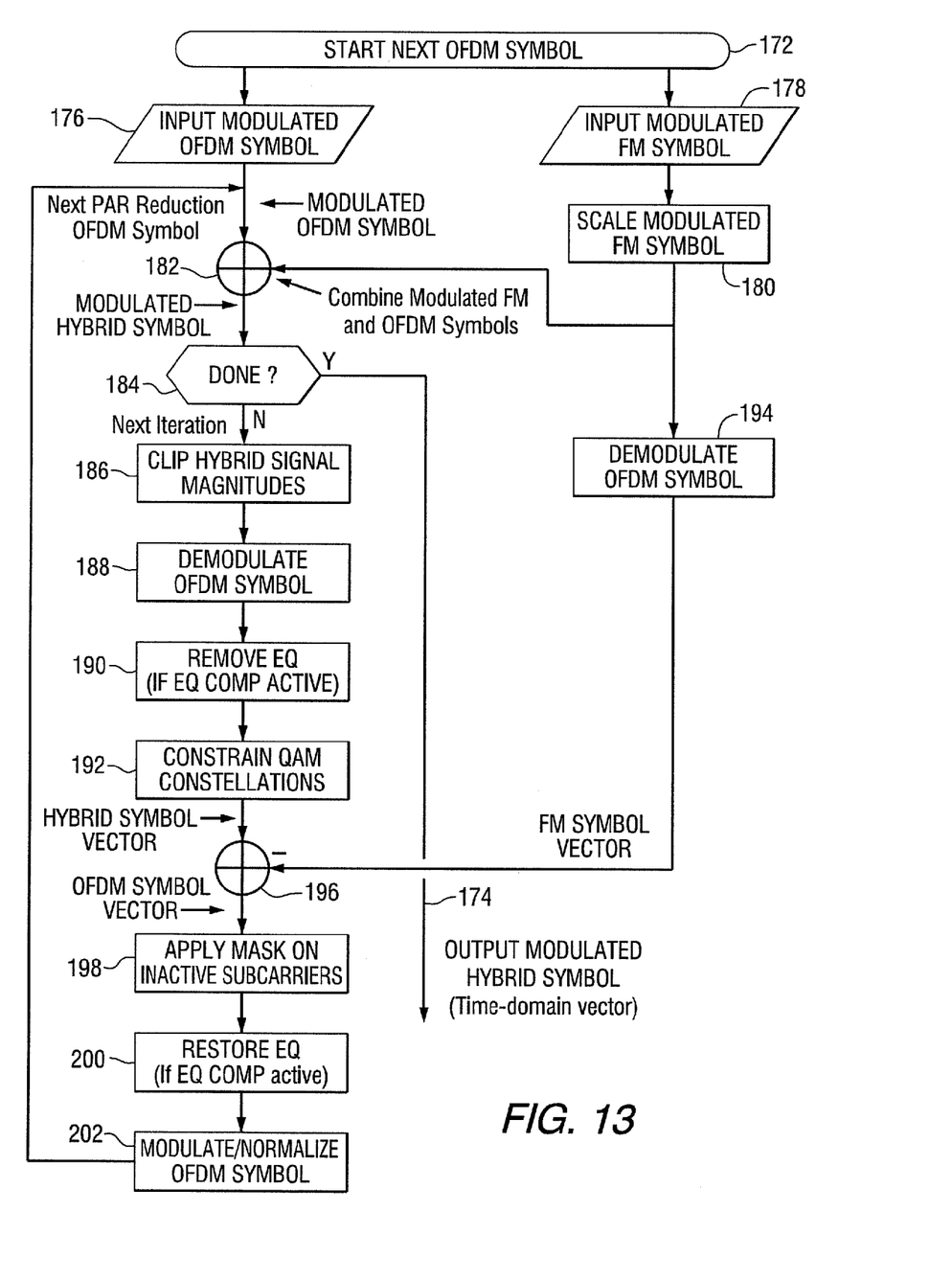
FIG. 13 is a flowchart of a PAR reduction algorithm iteration process.

In the process illustrated in FIG. 13, there are 6 types of symbol vectors in total. There are both frequency domain and time domain symbol vectors for each OFDM symbol, FM symbol, and Hybrid symbol (i.e., combined OFDM and FM). In the following description the word "Vector" is used to imply the frequency domain, and the words "Modulated Symbol" are used for the time domain.

In particular, the frequency and time domain symbol quantities are: OFDM Symbol Vector (frequency domain); Modulated OFDM Symbol (time domain); FM Symbol Vector (frequency domain); Modulated FM Symbol (time domain); Hybrid Symbol Vector (frequency domain); and Modulated Hybrid Symbol (time domain).

In one embodiment, the invention provides a method and apparatus that employs a hybrid PAR reduction algorithm to accommodate the analog FM signal in a hybrid IBOC radio system. The input to FIG. 13 is a sequence of modulated OFDM symbols, while the output is the PAR-reduced version of these symbols. This iterative algorithm reduces the PAR of the symbol while constraining the frequency domain (symbol vector) distortion and out-of-band emissions to acceptable levels. After some iterations, the algorithm converges to an acceptable compromise PAR while constraining the distortion to acceptable levels.

The flowchart of FIG. 13 starts at block 172 with a hybrid FM IBOC signal including a plurality of symbols. Two paths start in block 172, one path for the modulated OFDM symbol time-domain samples, and the other path for the corresponding modulated FM symbol samples. In one example, these symbols normally include 2160 complex time-domain samples each. This algorithm processes one symbol period at a time. The next symbol requires another execution of this algorithm, and so on.

The next Modulated OFDM Symbol is both the input and output of block 176. It simply shows that the algorithm is processing the next Modulated OFDM Symbol. If the Modulated OFDM Symbol is not directly available in the time domain, then the Modulated OFDM Symbol can be derived from the frequency-domain OFDM Symbol Vector (see block 38 of FIG. 2) via IFFT with OFDM Modulation, as was previously described. The OFDM Symbol Vector can be viewed as the frequency-domain representation for each FFT bin (subcarrier) prior to OFDM modulation, comprised of QPSK and/or QAM In-phase and Quadrature values for the active subcarriers, as well as some "noise" values in the inactive subcarriers.

The next Modulated FM Symbol of block 178 is a vector of FM analog time-domain signal samples, corresponding in time to the Modulated OFDM Symbol samples. The Modulated FM Symbol of block 178 is scaled in amplitude in block 180 to provide the proper ratio of analog and digital signals. Block 194 demodulates the Modulated FM Symbol using the same demodulation as is applied to the OFDM symbols. The demodulation output is the frequency-domain FM Symbol Vector. This is done to enable later frequency-domain subtraction of the FM Symbol Vector from the processed Hybrid Symbol Vector.

The Modulated OFDM Symbol and Modulated FM Symbol are combined in block 182 to form the Modulated Hybrid Symbol.

Block 184 determines if the last iteration of the PAR Reduction algorithm is done, and either continues another iteration, or outputs the Modulated Hybrid Symbol. The "DONE" condition can be determined simply by counting a fixed number of iterations, although it is possible to use some other metric such as the actual PAR for this iteration. Most of the possible PAR reduction is accomplished within 8 iterations.

The modulated FM symbol vector is scaled as shown in block 180 and combined with the modulated OFDM symbol vector in summation point 182. The algorithm processes samples of the FM analog signal that span each digital symbol. In one example, these are both vectors of 2160 complex sample per symbol at a sample rate of 744,187.5 Hz. For the purposes of this description, the symbols that are output from summation point 82 are referred to as modulated hybrid symbols.

A test is performed in block 184 to determine if the PAR reduction algorithm is done. If so, the modulated hybrid symbol is output on line 174. If not, an iteration of the algorithm is performed.

The modulated hybrid symbol magnitudes are clipped as shown in block 186. The Clip Signal Magnitudes block 186 represents a function that clips (limits) the magnitude of the complex time domain OFDM symbol samples (of the modulated hybrid symbol) to a predetermined value. The phase of each sample is preserved. The peak-to-average power ratio reduction is accomplished through iterative peak clipping and other signal processing to repair the distortion effects and unwanted spectral emissions. The iterative repair process partially restores the peak, but the peak gradually diminishes with each iteration. The "optimum" clip level for an all-digital IBOC signal had been empirically established at 1.5 times (or 3.52 dB) the average envelope level voltage. This "optimum" level offers the best peak reduction over a span of iterations while the undesirable byproducts being repaired at each iteration meet the signal integrity and out-of-band emission requirements.

For convenience, the nominal RMS value of the input complex OFDM time domain signal samples is scaled to one. The samples with magnitudes below 1.5 are unaffected; however, samples above 1.5 magnitude are set to 1.5 while preserving the phase of the input sample. Detecting samples above the clip level can be performed using the magnitude squared samples to minimize computations of the square root.

Although both soft and hard limiting functions can be used for clipping, the hard limiting function has shown to be simple and effective for this example. If the final PAR-reduced time-domain signal applied to the HPA is still expected to experience some compression at these reduced peaks, then a soft clipping or compression modeling the HPA should be included in this clipping process. By inclusion of this additional HPA compression, the PAR iterations will reduce the effects of this distortion.

The clip level for a hybrid signal depends upon the relative levels of the digital and analog components. Since the analog FM signal has a PAR of 1 (or 0 dB), the clip level of an analog-only signal would be one; thus, it would not need clipping. The clip level for a hybrid signal depends upon the relative levels of the digital and analog components. It is desirable to set this clip level based on an arbitrary analog-to-digital ratio.

The algorithm normalizes the digital portion of the signal to unity power (voltage squared), then adds the FM analog signal at the desired relative level. The analog signal is assumed to be a baseband complex exponential with unity power (magnitude=1), which is scaled by variable scale$_{fm}$ to achieve the desired analog-to-digital ratio. Intuitively, an expression to set the clip level should asymptotically approach 1.5 as the analog signal becomes very small compared to the digital component. Similarly, the clip level should asymptotically approach scale$_{fm}$ as the digital signal becomes very small compared to the analog.

A negative clip threshold is also established. Some Hybrid signal HPAs have difficulty accommodating signals when the signal envelope approaches zero, or becomes small (negative dB). For this reason, a negative (dB) clipping level is also established. The negative clip limits the magnitude of $s_n$ (negative in dB) below the RMS signal value. This level is dependent upon the actual HPA, and is not always needed. However, it was found that a negative clip level of −3 dB (or 0.707 magnitude) can be accommodated by the PAR Reduction algorithm without significant compromise on other performance parameters. So it may be prudent to set a default negative magnitude clip level of −3 dB (or 0.707 magnitude), which can be adjusted for any particular HPA requirement.

Next the OFDM symbol is demodulated as shown in block 188. The demodulation process in this block is the reverse of the modulate OFDM symbol process described previously. The demodulation steps include weighting and folding of the ends (cyclic prefix) of the symbol time, then computing an FFT to yield a somewhat distorted version of the input symbol data vector.

If the optional frequency-domain equalization compensation was performed in a previous step, then this equalization must be temporarily removed for some of the next steps of the algorithm in this iteration.

The Remove Eq. (if Eq. Comp. active) block 90 shows that if the optional frequency-domain equalization compensation was performed, then this equalization must be temporarily removed for some of the next steps of the algorithm in this iteration. The vector used to remove the equalization is similar to the original equalization vector, but all the elements are reciprocals of the original equalization vector.

The constrain QAM constellations block 92 removes the significant distortion introduced by the previous signal clipping process. The intermodulation distortion caused by clipping introduces noise (distortion) into all the frequency bins of the symbol vector. This function constrains the distortion components to acceptable levels. This distortion cannot be entirely eliminated since this would have the undesirable effect of restoring the peaks back into the time domain signal. Instead the distortion is modified in such a way as to minimize the degradation in QAM demodulation performance, and suppress out-of-band emissions to an acceptable level based upon a predefined out-of-band emissions mask vector. This process results in partial peak regrowth of the time domain signal. Multiple iterations tend toward convergence to minimize the peaks while constraining the intermodulation products to acceptable levels.

The nonactive subcarriers are also constrained to suppress out-of-band emissions within an acceptable predetermined mask level. An out-of-band emission mask is a vector of the same size as the OFDM symbol vector, where the inactive subcarriers are associated with a maximum mask magnitude defined for each inactive subcarrier. The inactive subcarriers for each OFDM symbol vector are constrained to not exceed the mask magnitude (or magnitude squared for computational efficiency) value. Each subcarrier (FFT bin) is unaffected when its value is below the mask. When a bin exceeds the mask, the magnitude is constrained to the mask level while preserving the phase of the bin. The following algorithm achieves this mask constraint:

The Modulated FM Symbol is demodulated as shown in block 94 and removed (i.e., subtracted) from the constrained QAM constellation as shown in subtraction point 96. Blocks 88 and 94 show "DEMODULATE OFDM SYMBOL." Although block 94 is actually processing a MODULATED FM SYMBOL, it is demodulated as if it were an OFDM symbol so that its effects can be processed in the frequency domain on the OFDM SYMBOL VECTOR.

The addition (Block 182) of the Modulated FM Symbol to the Modulated OFDM Symbol and later subtraction (Block 196) of the FM Symbol Vector are significant elements of this method. First, the addition of the Modulated FM Symbol allows the composite Modulated Hybrid Symbol to be PAR-reduced (clipped). Subsequent OFDM demodulation in Block 188 includes the interference effects of the Modulated FM Symbol; however, these interference effects are eliminated in the Constrain QAM Constellations Block 182. Therefore, this method eliminates analog-to-digital host interference caused by the FM bandwidth extending beyond ±.100 kHz. Second, the FM Symbol Vector subtraction (Block 196) allows subsequent suppression (Apply Mask on Inactive Subcarriers Block 98) of the intermodulation products due to the clipping. If the FM Symbol Vector were not removed, then it would be impractical to process the intermodulation products that lie far beneath the FM signal spectrum. Therefore, this method also reduces the digital-to-FM interference, or intermodulation distortion to the FM signal due to clipping.

After the OFDM signal is demodulated and removed from the constrained QPSK constellation, a mask is applied to the inactive subcarriers in block 98, and equalization is restored in block 200.

The restore equalization (if equalization compensation is active) block 200 shows that if the optional frequency-domain equalization compensation was performed in a previous step, then this equalization must restored since it was removed in a prior step.

Then the OFDM symbol is modulated and normalized in block 202 and used for the next iteration of the algorithm. This block converts the input symbol data vector into a time-domain signal for each OFDM symbol.

Additional details of the steps illustrated in FIG. 13 are described in U.S. Pat. No. 8,798,196.

While the present invention has been described in terms of several embodiments, it will be apparent to those skilled in the art that various changes can be made to the disclosed embodiments without departing from the scope of the invention, as set forth in the following claims.

What is claimed is:

1. A method comprising:
   (a) using a modulator to quadrature amplitude modulate a signal including a set of subcarriers with a set of data to produce an Orthogonal Frequency Division Multiplexing (OFDM) modulated symbol vector; and
   using processing circuitry to (b) limit the magnitude of the modulated symbol vector to produce a first limited OFDM modulated symbol; (c) demodulate the first limited OFDM modulated symbol to recover distorted Quadrature Amplitude Modulation (QAM) constellations; (d) constrain points in the distorted QAM constellations recovered from the first limited OFDM modulated symbol to produce constrained QAM constellations wherein: points at corners of the distorted QAM constellations are constrained both in-phase and in-quadrature to values greater than or equal to a first minimum threshold; points along edges, said points along edges not including any points at corners of the distorted QAM constellations are constrained to either in-phase values greater than or equal to a second minimum threshold value and in quadrature to a first predetermine range of values on either side of the undistorted constellation point, or in-quadrature to values greater than or equal to a third minimum threshold value and in phase to a second predetermine range of values on either side of the undistorted constellation point; and internal points of the distorted QAM constellations are constrained to both in-phase or in-quadrature values less than or equal to a third predetermined range of values on either side of the undistorted constellation point; (e) modulate an OFDM symbol vector with the constrained QAM constellations to produce a modified modulated OFDM symbol; and (f) output the modified modulated OFDM symbol.

2. The method of claim 1, wherein steps (b) through (e) are repeated prior to step (f).

3. The method of claim 1, wherein first, second and third predetermined ranges have equal values.

4. The method of claim 1, wherein first, second and third minimum thresholds have equal absolute values.

5. The method of claim 1, wherein signal includes a main AM carrier and BPSK modulated subcarriers, and the method further comprises:
   restoring training symbols and the BPSK subcarriers to original undistorted values; and
   removing imaginary component distortion from the main AM carrier after peak-to-average power reduction.

6. The method of claim 5, further comprising:
   reducing a time domain peak of the AM main carrier by adjusting the AM main carrier amplitude, wherein symbol pulse-shaping of the AM main carrier keeps the amplitude adjustments orthogonal to other subcarriers; and a constant average main carrier amplitude is maintained.

7. The method of claim 1, further comprising:
   applying a mask to inactive subcarriers in the plurality of subcarriers of the OFDM symbol vector prior to step (e).

8. The method of claim 7, wherein enhancement sidebands in an AM core-only signal are replaced with intermodulation distortion.

9. The method of claim 8, wherein the mask in the enhancement sidebands is adjustable to balance peak-to-average power ratio reduction performance versus interference.

10. The method of claim 1, wherein signal includes an FM-modulated analog component and BPSK modulated reference subcarriers, and the method further comprises:
    restoring the BPSK subcarriers to original undistorted values.

11. A transmitter for reducing peak-to-average power ratio in an Orthogonal Frequency Division Multiplexing (OFDM) signal, the transmitter comprising:
    a modulator configured to quadrature amplitude modulate a signal including a set of subcarriers with a set of data to produce an OFDM modulated symbol vector;
    processing circuitry configured to (a) limit the magnitude of the modulated symbol vector to produce a first limited OFDM modulated symbol; (b) demodulate the first limited OFDM modulated symbol to recover distorted Quadrature Amplitude Modulation (QAM) constellations; (c) constrain points in the distorted QAM constellations recovered from the first limited OFDM modulated symbol to produce constrained QAM constellations wherein: points at corners of the distorted QAM constellations are constrained both in-phase and in-quadrature to values greater than or equal to a first minimum threshold; points along edges, said points along edges not including any points at corners of the distorted QAM constellations are constrained to either in-phase values greater than or equal to a second minimum threshold value and in quadrature to a first predetermine range of values on either side of the undistorted constellation point, or in-quadrature to values greater than or equal to a third minimum threshold value and in phase to a second predetermine range of values on either side of the undistorted constellation point; and internal points of the distorted QAM constellations are constrained to both in-phase or in-quadrature values less than or equal to a third predetermined range of values on either side of the undistorted constellation point; (d) modulate an OFDM symbol vector with the constrained QAM constellations to produce a modified modulated OFDM symbol; and (e) output the modified modulated symbol; and
    an amplifier for amplifying the modified modulated OFDM symbol.

12. The transmitter of claim 11, wherein the processing circuitry is configured to repeat functions (a) through (d) before performing function (e).

13. The transmitter of claim 11, wherein first, second and third predetermined ranges have equal values.

14. The transmitter of claim 11, wherein first, second and third minimum thresholds have equal absolute values.

15. The transmitter of claim 11, wherein signal includes a main AM carrier and BPSK modulated subcarriers, and the processing circuitry is configured to restore training symbols and the BPSK subcarriers to original undistorted values and remove imaginary component distortion from the main AM carrier after peak-to-average power reduction.

16. The transmitter of claim 15, wherein the processing circuitry is configured to reduce a time domain peak of the AM main carrier by adjusting the AM main carrier amplitude, wherein symbol pulse-shaping of the AM main carrier keeps the amplitude adjustments orthogonal to other subcarriers, and a constant average main carrier amplitude is maintained.

17. The transmitter of claim 11, wherein the processing circuitry is configured to apply a mask to inactive subcarriers in the plurality of subcarriers of the OFDM symbol vector prior to modulating the OFDM symbol vector with the constrained QAM constellations to produce the modified modulated OFDM symbol.

18. The transmitter of claim 17, wherein enhancement sidebands in an AM core-only signal are replaced with intermodulation distortion.

19. The transmitter of claim 18, wherein the mask in the enhancement sidebands is adjustable to balance peak-to-average power ratio reduction performance versus interference.

20. The transmitter of claim 11, wherein signal includes an FM-modulated analog component and BPSK modulated reference subcarriers, and the processing.

* * * * *